May 8, 1962 F. S. ALLINQUANT 3,033,553
OLEO-PNEUMATIC SUSPENSION SYSTEM FOR MOTOR VEHICLES
Filed Oct. 23, 1959 3 Sheets-Sheet 1

United States Patent Office 3,033,553
Patented May 8, 1962

3,033,553
OLEO-PNEUMATIC SUSPENSION SYSTEM FOR MOTOR VEHICLES
Fernand Stanislas Allinquant, 6–10 Rue Olier, Paris, France
Filed Oct. 23, 1959, Ser. No. 848,426
Claims priority, application France Nov. 8, 1958
2 Claims. (Cl. 267—15)

It has already been proposed to use in the suspension system of a motor vehicle an oleo-pneumatic telescopic member interposed between a bracket solid with the frame of the vehicle and the lower arm of a set of two parallel support arms articulated to the frame and to the stub axle support of a wheel of the vehicle. The cylinder of this telescopic member is connected to the frame, and its piston rod is connected to the said support arm by articulation members which permit movement of the suspension system by extension or retraction of the telescopic member, while the piston rod is guided in the axis of the cylinder. The piston which has passages of small section, separates two chambers in the cylinder, the lower being filled with oil while the upper is partially filled with oil with highly compressed air above the oil. The force developed by the suspension system corresponds to the pressure of this compressed air, which the movements of the piston cause to vary, increasing or reducing the volume of the space in which the air is enclosed. The resistance to flow of oil through the piston dampens these movements.

A difficulty in this type of appliance is to ensure that cavitation is not caused in the oil during rapid movements of the piston in the cylinder, because for this it is necessary that at any instant the quantity of oil crossing the piston is sufficient to top the increase in volume of the cylinder chamber whose volume is increasing. Another difficulty is connected with the fact that it is difficult to avoid frictional resistance of the piston or its rod varying in relation to the cylinder or the members which guide it during the movements of the suspension system, because these movements tend to cause the axis of the rod to oscillate in relation to the axis of the cylinder, since the rod and the cylinder are respectively connected to components which have a movement of rotation in respect of one another. Cavitation and variable friction are major drawbacks and it has not been found possible with known suspension systems to avoid the risk of these drawbacks.

The present invention relates to an oleo-pneumatic suspension system for motor vehicles in which such drawbacks cannot arise.

According to the invention there is provided an oleo-pneumatic suspension system for motor vehicles, comprising a piston sliding in a cylinder which piston partitions the cylinder in a fluid-tight fashion and bounds under the top end of said cylinder a chamber the volume of which can vary with the movements of the piston, and a duct connecting said top end of the cylinder to the lower part of a closed casing, the space comprising the said chamber, the duct and the lower part of the casing being filled with oil, while the upper part of the casing contains highly compressed air.

The piston is subjected to the pressure of the compressed air in the casing which the oil transmits to it. When the wheel rises in relation to the frame, the piston presses back the oil, so that the pressure of the compressed air increases. When the wheel ceases to rise, the thrust of the oil on the piston causes it to descend again, so that there cannot be any cavitation nor any flapping of the suspension system.

The damping of the movements of the suspension system can be effected by any known means ensuring a braking of the flow of oil. The resistance of the duct to this flow could be sufficient. If not, a partition pierced with restricted oil passages, possibly provided with flap-valves, could be interposed at any point between the maximum level reached by the piston and the minimum level of the oil in the casing. Inside this casing, the oil can, if desired, be separated from the air by a deformable diaphragm.

Preferably the casing which contains, for part of its volume, highly compressed air the pressure of which determines the strength of the suspension system is common to the suspension systems of two wheels, the cylinders of each suspension system being both connected to the lower part of this common casing. The result of the intercommunication between these cylinders is that the oil pushed back by the rise of one of the pistons tends to cause the other piston to descend, so that the rise of one wheel tends to lower the other, which decreases the amplitude of the oscillatory movements of the frame.

According to another important feature, the rod of the piston is articulated in said piston, the cylinder being open towards the bottom. This eliminates the variable frictions which are inevitable when the rod is solid with the piston.

An embodiment of the invention will now be described by way of example, with reference to the accompanying drawings, in which.

Figure 3:
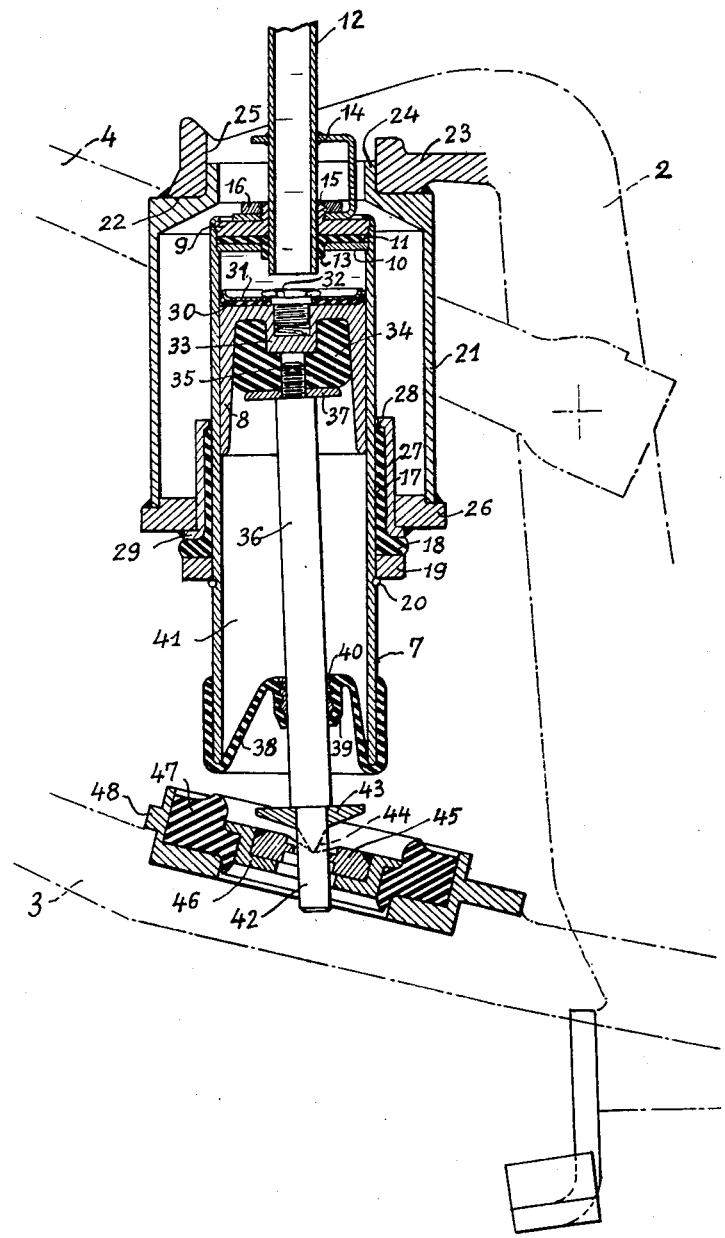
FIGURE 3 is a view in axial section of a suspension system.

Each suspension system (FIGURE 1) comprises a telescopic member 1, interposed between a bracket 2 of the frame of the motor vehicle and the lower arm 3 of a set of two parallel arms 3 and 4 articulated to the frame and to the support 5 of the stub axle of a wheel 6 so as to form a deformable parallelogram. As FIGURE 3 shows, the telescopic member 1 comprises a cylinder 7 and a piston 8 sliding in this cylinder, which are respectively connected to the bracket 2 of the frame and to the lower arm 3 of the wheel support.

The cylinder 7 consists of a tube the top of which is obturated by an inset end 9. This end 9 holds a rubber washer 11, designed to ensure the fluid tightness of the end 9 with the wall of the cylinder 7 and with a tube 12 projecting into the cylinder 7 for a short distance through a central hole in said end 9, against a metal washer 10, supported against a shoulder of the bore of the cylinder 7. In the free state this rubber washer 11 has an overall diameter slightly larger than that of the bore of the cylinder 7 and a hole definitely too small for the tube 12, so that the forcible engagement of the tube 12 deforms the inner rim of the washer 13 applied against this tube through the washer 10. Outside the cylinder 7 the tube 12 traverses a stirrup member 14 the upper flange of which is welded to this tube 12 and whose lower flange admits a threaded boss 15 of said end 9, on which is screwed a nut 16 fixing the stirrup member 14 on the end 9 and thus retaining the tube 12.

The cylinder 7 is fitted with a rubber sleeve 17 the lower end of which has an exterior bead 18 supported on a ring 19 held in a rather low position along the cylinder 7 by a metal joint 20 half embedded in the cylinder wall. The said sleeve 17 acts as a flexible intermediary between the cylinder 7 and the bracket 2 of the frame.

In the absence of a projection at this level on the side of the bracket to accommodate the said flexible sleeve 17, the cylinder 7 is connected to the top of the bracket 2 by a metal fitting. This takes the form of a reversed cylindrical pot 21 whose end 22, with a large aperture, is centered by a hollow boss 24 in a bore 25 of the horizontal portion 23 of the top of the bracket 2, and is fixed by welding. At the lower outlet of the pot 21 is welded an annular plate 26 which accommodates a metal cover 27 enveloping the rubber sleeve 17; this cover 27 has at its upper end an annular bottom 28 providing a clearance round the cylinder, and at its lower end an outer collar 29 which is engaged under the plate 26 and is welded to said plate at its periphery. The cylinder 7 is thus held elastically by the rubber sleeve 17 in a rigid assembly solid with the frame 2 of the motor vehicle.

The piston 8 sliding in the cylinder 7 has on its upper surface a sealing washer 30 whose diameter in the free condition is greater than the diameter of the bore of the cylinder 7, so that it forms a lipped joint against the wall of the cylinder 7. This rubber washer 30 is held against the piston by a metal washer 31, held by the head of a screw 32 engaging in a tapped blind hole, pierced from the top surface of the piston in the axis of a boss 33 of the under surface of the piston. The inside of the piston 8, in its upper portion, is occupied by a thick rubber plug 34, pierced axially by a hole for centering said plug 34 on the boss 33 and by a hole to accommodate the screwed end 35, of reduced diameter, of a piston rod 36, supported against the under surface of the rubber plug 34 by means of a metal washer 37 seated on the shoulder formed on the end 35. This rod 36 as it emerges from the cylinder 7 passes through the thin flexible wall of a rubber plug 38 capping the open lower end of the tube which forms the cylinder 7. For this purpose this wall has an exterior central boss 39 in which a socket 40 has been embedded in casting, which socket can slide on the rod 36 with lubricated friction. The space 41 of the cylinder 7 is thus hermetically sealed from the atmosphere and sheltered from dust and humidity. The plug 38 being placed in position when the piston is low down in the cylinder, the quantity of air enclosed in the space 41 is slight, and is always under sub-pressure.

The piston rod 36 terminates at the bottom in an end of reduced diameter 42 on which engages, supported against the shoulder which is formed, a washer 43 whose lower face has knife-edge projections 44. The end 42 of the rod passes with a slight clearance through a ring 45 the upper surface of which has V-shaped indentations and which acts as a support to the knife-edges. The ring 45 is embedded in a seating 46 with an external flange, the indentations being directed parallel to the axis of articulation of the support arm 3, on an annular rubber pad 47 seated in a cup 48 fixed on the arm 3.

Figure 1:
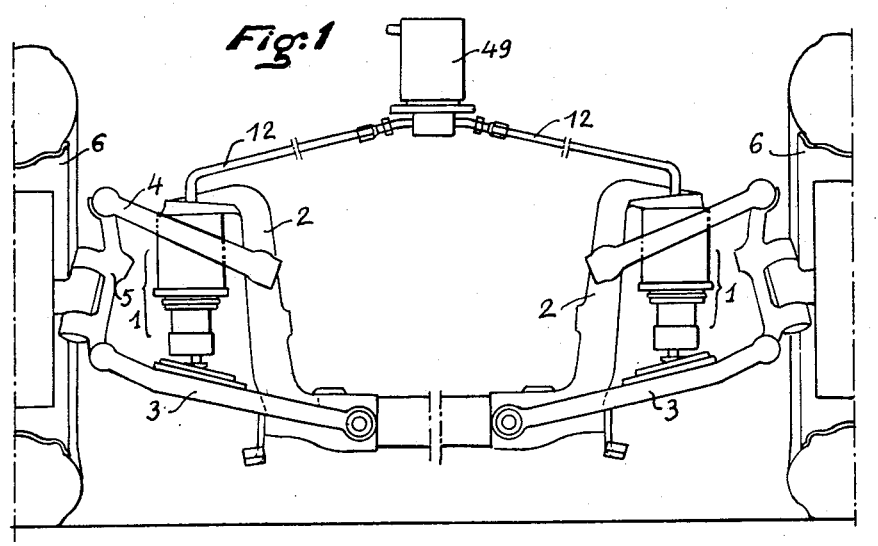
FIGURE 1 is a diagram showing the suspension arrangements of two wheels of a vehicle connected to a casing according to the invention which is common to both.
Figure 2:
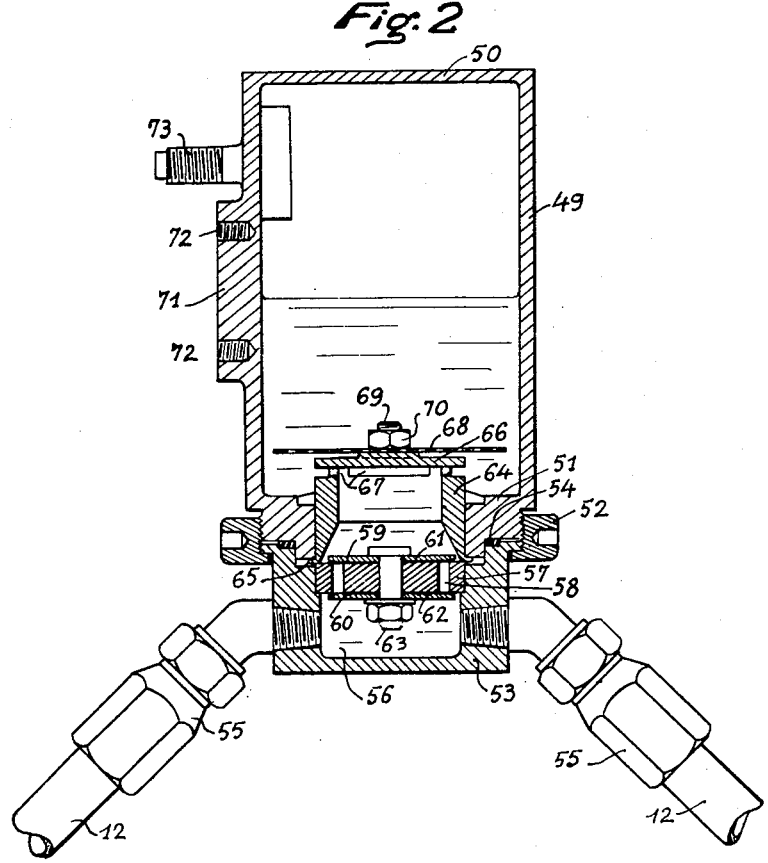
FIGURE 2 is a view in axial section of the casing.

The tube 12 emerging from the top of the cylinder 7 extends to the lower part of a cylindrical casing 49 at a distance from the suspension system (FIGURES 1 and 2). This casing is closed at the top by a solid end 50, and its lower end 51, pierced with a large hole, is turned and threaded exteriorly to take a retaining ring 52 holding a cap 53 against this end, a sealing washer 54 being interposed. The tube 12 is fixed to the lateral wall of the cap 53 by a connection 55 and opens into the chamber 56 inside this cap below a partition 57, centered in a bore of the cap 53 and abutting against a shoulder at the bottom of this bore. The partition 57 is, in accordance with a known arrangement, traversed by perforations 58, arranged in a ring and intended to form passages in opposite directions. Foil discs 59 and 60 forming flap valves are held against its two faces by backing washers 61 and 62, the lower surface being curved at the edges, the whole assembly being held by a central bolt 63. Each of the valves 59 and 60 covers a part of the perforations and uncovers others by means of the holes which it presents to these latter; this is a known arrangement. A strainer, consisting of a hollow cylindrical component 64 whose lower edge, thinned out by a conical bore, is inset at 65 under the bottom of the casing 49, and which has passage ports 67 adjacent to its own bottom 66, is held in the hole in the lower end 51 of the casing. The strainer has an overlapping washer 68, forming a deflector, which is centered on a threaded stud 69 projecting at the end of this strainer and which is fixed to this end by a nut 70.

The casing 49 has means of fixing to the frame of the motor vehicle, for instance a boss 71 projecting from its side wall and pierced with tapped blind holes 72. At its upper part one of its walls is traversed by a tube with a valve 73 for the introduction of compressed air.

As has been shown, the casing which completes the suspension system may be common to the suspension systems of two wheels of the motor vehicle. The cylinders of the suspension systems above the pistons, the tubes which connect them to the casing and the lower part of the casing up to a variable level which is always above the deflector are filled with oil; the upper part of the casing is filled with highly compressed air at a pressure of the order of 20 kg. per sq. cm. The oil transmits to each suspension member the pressure of this air which, acting under the upper end of the cylinder and on the top of the piston, tends to cause the former to rise with the frame and to cause the latter to descend, supporting the piston rod 36 oscillating knife-edges 44 on the support ring 45 against the support arm 3 of the wheel. The thrust on the piston balances the load of the frame on the wheel for a mean position of the piston.

When a vertical movement of the wheel occurs in relation to the frame, the lateral displacement of the support of the knife-edges 44 which accompanies the oscillation of the carrier arm 3 causes, during the displacement of the piston, an oscillation of its rod 36 in relation to the axis of the cylinder 7, which oscillation is rendered possible by the flexibility, on the one hand, of the connection of this rod to the piston by means of the rubber plug 34, and on the other hand of the wall of the rubber plug 38 which carries the socket 40 in which this rod passes. The movement of the piston does not therefore cause any variation in friction, which in any case is extremely slight because of the polish given to the metal surfaces in contact. When the wheel rises in relation to the frame, the piston rises in the cylinder pressing back the oil which raises the pressure of the air in the casing. When this rising movement stops, the air pressure exceeds that required to balance the static load, and the oil, pressed back in the opposite direction by the thrust of the air, makes the piston fall again in the cylinder. The movement of extension of the telescopic member being thus produced by the thrust of the oil, the piston never loses contact with said oil, so that no cavitation can occur nor any flapping of the suspension system. Thus the suspension system oscillates in a prefectly regular motion without jerks.

When the suspension systems of the two wheels are in intercommunication through a common casing, as in the example represented in FIGURE 1, the rise of one wheel tends to lower the other. This decreases the extent of the rolling of the motor vehicle when it is a matter of corresponding wheels, for instance the two front wheels, or pitching in the case of one front wheel and one rear wheel.

The damping of the movements of the suspension systems is ensured by the resistance opposed to the flow of the oil, for example through the perforated partition 57 provided with flaps, interposed at the inlet of the case. Such damping member could be placed at some other point and could have any other known form. The damping member could be omitted altogether if the friction of the oil in the ducts 12 is sufficient.

A diaphragm could be provided in the casing to separate the oil from the air; such a separating diaphragm, and the means which might be provided for fixing it, are well known. There is then no need for the deflector.

I claim:

1. An oleo-pneumatic suspension system for two wheels respectively supporting opposite sides of a vehicle frame, comprising in combination, a cylindrical casing closed at the upper end having an apertured lower end fixed to said frame, a cap tightly clamped to said lower end and covering said aperture, an insufflation valve mounted on the upper part of said casing, for each wheel a cylindrical pot formed with large apertured ends and with an upper collar fitted into an aperture in a bracket of the vehicle frame, a cylinder formed with an upper end and with an open lower end and located coaxially within said pot, a metal sleeve fixed through the lower apertured end of said pot, a ring fitting on said cylinder and locked to a lower part of said cylinder, a rubber sleeve interposed between said metal sleeve and the cylinder wall and formed with a bead between said pot lower end and said ring, a piston adapted to slide within said cylinder and formed with a lower cavity, a rubber plug within said cavity, a piston rod having an upper end engaging said rubber plug and a lower end in knife-edge engagement on a wheel supporting lever, a pipe through the upper end of each of said cylinders connecting each cylinder to said casing cap, oil filling said pipes and said cylinders and said casing up to a free level under air compressed in the upper part of said casing.

2. An oleo-pneumatic suspension system according to claim 1, comprising further in combination, a rubber cap closing said open lower end of each cylinder and formed with a flexible bottom wall and a central boss embedding a socket adapted to slide on the rod of said cylinder piston.

References Cited in the file of this patent

UNITED STATES PATENTS

| | | |
|---|---|---|
| 1,119,984 | Oxnard | Dec. 8, 1914 |
| 2,756,046 | Lucien | July 24, 1956 |
| 2,756,989 | Peras | July 31, 1956 |
| 2,812,954 | Lyon | Nov. 12, 1957 |
| 2,823,915 | Bourcier De Carbon | Feb. 18, 1958 |
| 2,902,288 | Dill | Sept. 1, 1959 |
| 2,923,557 | Schilling et al. | Feb. 2, 1960 |

FOREIGN PATENTS

| | | |
|---|---|---|
| 682,110 | Great Britain | Nov. 5, 1952 |
| 544,741 | Italy | June 19, 1956 |
| 1,183,446 | France | Jan. 26, 1959 |